(12) United States Patent
Dubois

(10) Patent No.: US 8,991,322 B2
(45) Date of Patent: Mar. 31, 2015

(54) LOAD CARRIER TRAY

(75) Inventor: Jean-Marc Dubois, Bremgarten (CH)

(73) Assignee: Georg Utz Holding AG, Bremgarten (CH)

(*) Notice: Subject to any disclaimer, the term of this patent is extended or adjusted under 35 U.S.C. 154(b) by 428 days.

(21) Appl. No.: 12/998,057

(22) PCT Filed: Sep. 8, 2009

(86) PCT No.: PCT/EP2009/006495
§ 371 (c)(1), (2), (4) Date: Mar. 14, 2011

(87) PCT Pub. No.: WO2010/028793
PCT Pub. Date: Mar. 18, 2010

(65) Prior Publication Data
US 2011/0163055 A1 Jul. 7, 2011

(30) Foreign Application Priority Data
Sep. 15, 2008 (DE) .......................... 10 2008 047 351

(51) Int. Cl.
*B65D 1/48* (2006.01)
*B29C 45/00* (2006.01)

(52) U.S. Cl.
CPC ........... *B65D 1/48* (2013.01); *B29C 2045/0049* (2013.01); *B65D 2519/00129* (2013.01); *B65D 2519/00442* (2013.01); *Y10S 108/901* (2013.01)
USPC ..................... 108/57.16; 108/57.28; 108/901; 264/328.1

(58) Field of Classification Search
CPC ... B65D 1/48; B65C 45/0046; B65C 45/0049
USPC .................. 108/57.16, 57.28, 901; 264/328.1
See application file for complete search history.

(56) References Cited

U.S. PATENT DOCUMENTS 4,316,419 A 2/1982 Cupido

FOREIGN PATENT DOCUMENTS

DE 37 09 190 9/1988

OTHER PUBLICATIONS

International Search Report of PCT/EP2009/006495 mailed Nov. 17, 2009.
International Preliminary Report on Patentability of PCT/EP2009/006495 mailed Mar. 24, 2011.

*Primary Examiner* — Michael Safavi
(74) *Attorney, Agent, or Firm* — Collard & Roe, P.C.

(57) ABSTRACT

The invention relates to a load carrier, particularly a tray (1) for the transport and storage of goods, having a base (2) comprising a receiving surface (4) for the goods to be transported, and a base bottom having a structure (5) made from ribs (6, 7) crossing each other and projecting vertically from the base surface, characterized in that aligned openings (9) are made from one base side to the other in adjacent ribs (7) arranged parallel to each other, into the openings a reinforcement bar (11) can be inserted from one side of the base to the opposite side, wherein the openings (9) in the ribs (7) are formed by means of cut-outs (8) made in the vertical ribs (7) through the receiving surface (4).

4 Claims, 4 Drawing Sheets

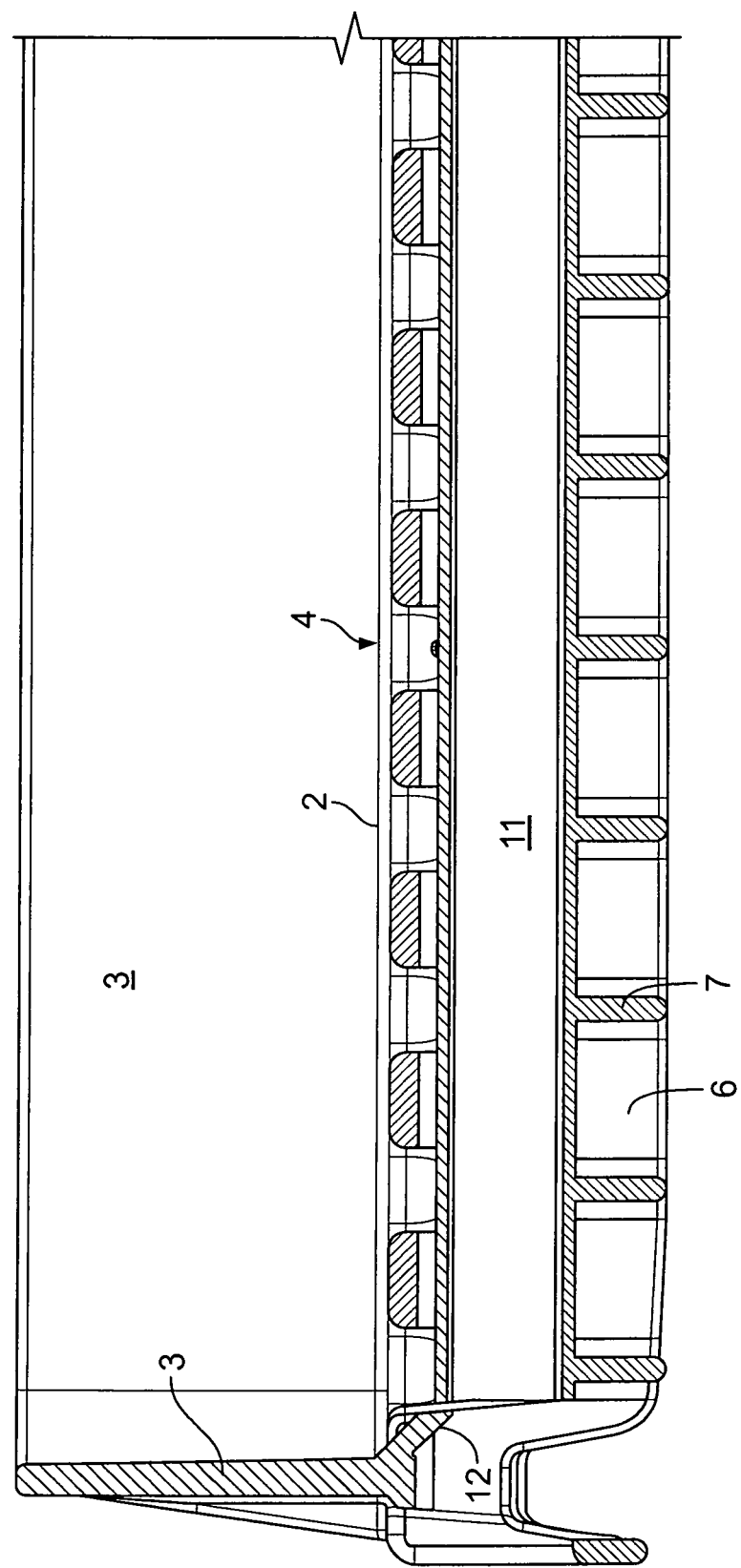

LOAD CARRIER TRAY

CROSS REFERENCE TO RELATED APPLICATIONS

Figure 1:
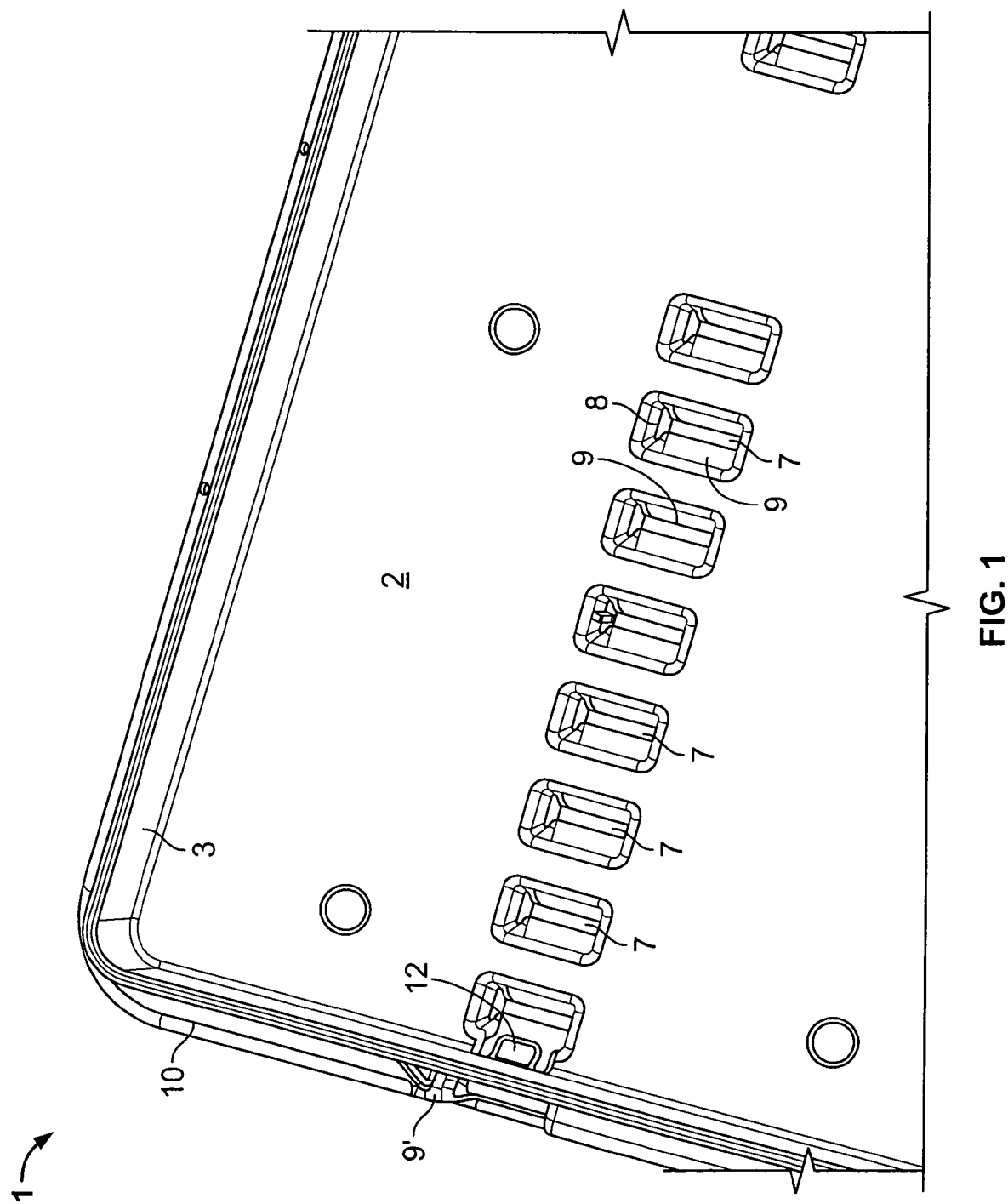

This application is the National Stage of PCT/EP2009/006495 filed on Sep. 8, 2009, which claims priority under 35 U.S.C. §119 of German Application No. 10 2008 047 351.0 filed on Sep. 15, 2008, the disclosure of which is incorporated by reference. The international application under PCT article 21(2) was not published in English.

The invention relates to a load carrier, particularly a tray, for transport and storage of goods, which has a bottom with an accommodation surface for the goods to be transported, and a bottom underside having a structure composed of intersecting ribs that project vertically away from the bottom surface.

Although the present invention can also be used for transport containers, pallets, and large load carriers, it will be explained, in the following, using a tray. Such trays are load carriers having a flat construction, and generally a not very high edge. They have an accommodation surface for the goods to be transported, and generally stand on their bottom surface.

For reinforcement and stiffening of the trays (or also of the container bottoms), these are provided with a rib structure on the bottom underside. This structure can consist of ribs that project vertically downward from the bottom underside and run at right angles to one another, whereby in the present case, the orientation of the ribs is parallel to the side edges of the tray.

Depending on the goods to be transported, such a rib structure alone is not always sufficient for reinforcement and stiffening of the tray.

For this reason, such trays (but also the containers mentioned above) are reinforced, on the bottom side, with strips, for example made of steel, which are integrated into the bottom.

The invention is based on the task of indicating a load carrier of the type stated initially, in which one or more such reinforcement strips can be introduced only if needed, and the accommodation structures for the reinforcement strips can be implemented in technically simple and uncomplicated manner, during production of the load carrier.

The invention accomplishes this task in that openings that align with one another are introduced into ribs that are disposed parallel to one another and adjacent to one another, from one bottom side to the other, into which openings a reinforcement strip can be pushed from one side of the bottom all the way to the opposite side, whereby the openings in the ribs are formed by recesses introduced into the vertical ribs through the accommodation surface.

The task according to the invention is also accomplished by a method for injection-molding of a load carrier, particularly a tray, which has a bottom having an accommodation surface for the goods to be transported, and a bottom underside having a structure composed of intersecting ribs that project vertically away from the bottom surface, whereby openings that align with one another are introduced into ribs that are disposed parallel to one another and adjacent to one another, from one bottom side to the other, into which openings a reinforcement strip can be pushed from one side of the load carrier to the other, and the process management for production of the openings that align with one another, in the vertical ribs, takes place in that a core of an injection-molding tool half, in each instance, which essentially forms the accommodation surface, plunges from the accommodation surface side into the region of a vertical rib, forming a recess in the bottom and this rib, and, vice versa, a corresponding core, in each instance, of the second injection-molding tool half, which forms the bottom underside, plunges in from the rib side, whereby the cores touch one another laterally.

Therefore, although the accommodation channel for the reinforcement strips runs parallel to the bottom surface, the injection-molding tool does not have to be equipped with a molding tool part that works perpendicular to the mold-closing direction.

Because of the fact that the cores of the two molding tool halves that come into contact with one another work in the mold-closing direction, the molding tool has a technically simple structure and can produce the openings that align with one another in a single work step with the production of the tray.

The cores, which generally have the shape of a truncated pyramid, work together in such a manner that when the molding tool is closed, two pyramid sides of the core, in each instance, come into contact with the adjacent core, which is directed in the opposite direction, and thereby the one core produces the recess in the bottom and in the corresponding rib, and the core that works in the opposite direction forms the rib structure and the underside of the bottom. Where the two cores that interact with one another come into contact, no plastic material can get in during injection molding, so that the openings that align with one another remain after unmolding.

In the edge-side openings, in other words where the reinforcement strip can be pushed in, on the one hand, and ends after being pushed in, on the other hand, holding elements for the reinforcement strip are provided.

These are structured in such a manner that an elastic tongue is formed into an edge-side opening, as a holding element (whereby the elasticity of the plastic material used for the load carrier is utilized). A stop is formed into the opening that lies on the opposite side, which prevents the reinforcement strip from slipping out of the load carrier in this direction.

Alternatively, a second elastic tongue can also be provided here.

The tongue is directed downward at a slant and in the insertion direction of the reinforcement strip. Thus, the elastic tongue is bent upward when the reinforcement strip is pushed in, until the reinforcement strip has been completely introduced, so that the elastic tongue can spring back into its relaxed position behind the end of the reinforcement strip.

In the following, the invention will be shown and explained in greater detail, using drawings.

These show:

FIG. 1 corner region of a tray, seen from the accommodation surface side (without reinforcement strip)

Figure 2:
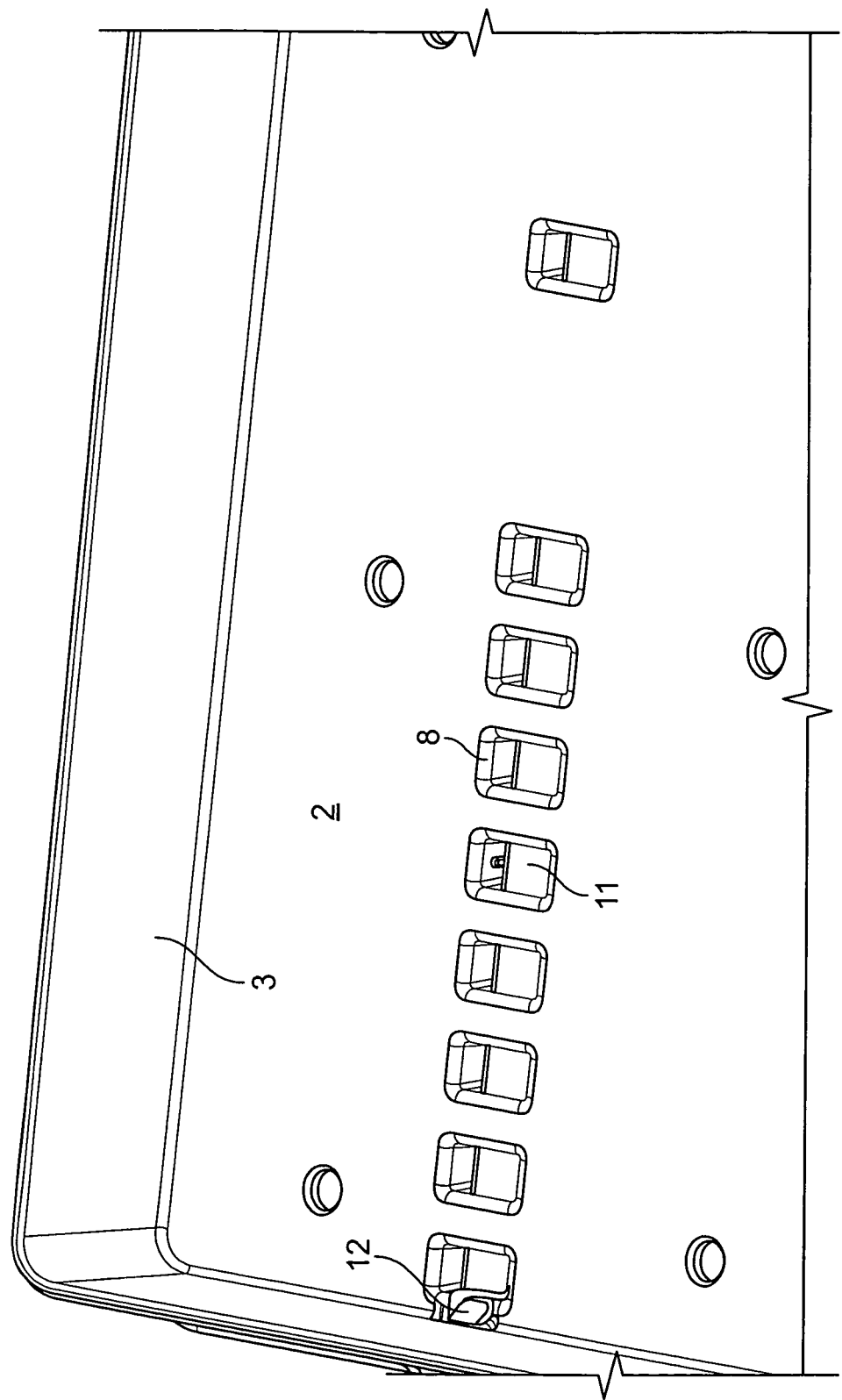

FIG. 2 tray according to FIG. 1 with reinforcement strip introduced

Figure 3:
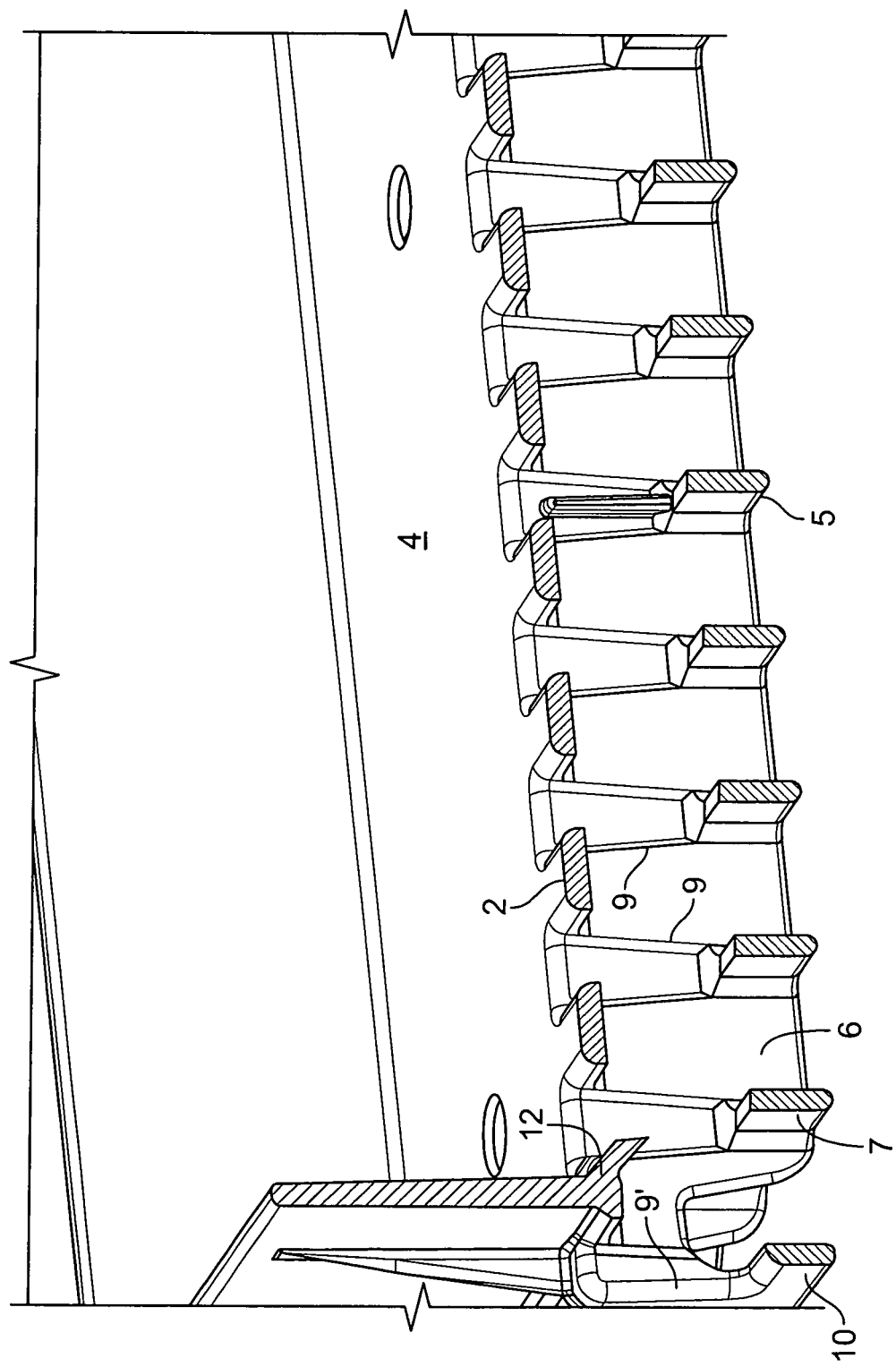

FIG. 3 tray according to FIG. 1 in cross-section (without reinforcement strip)

FIG. 4 tray according to FIG. 3 (with inserted reinforcement strip)

In FIGS. 1 to 4, an injection-molded plastic tray is shown in perspective, in a partial representation, and provided, in general, with the reference symbol 1. It consists essentially of a bottom 2 and a circumferential frame 3, which has an accommodation surface 4 for goods to be transported. On the side of the bottom 2 that lies opposite the accommodation surface 4, the bottom 2 is reinforced by means of a rib structure 5.

The rib structure 5 consists of ribs that intersect at a right angle and are directed vertically away from the bottom underside.

As is particularly evident from FIG. 3, the ribs 6 and 7 run parallel to the side edges of the tray 1.

As is clearly evident from FIGS. 1 and 2, recesses 8 are formed into the accommodation surface 4 of the bottom 2, which recesses continue conically all the way into a rib 7 that lies underneath them. These recesses 8 are disposed on a straight line from one bottom edge to the other.

As is evident from FIG. 3, the recesses 8 form openings 9 that align with one another, whereby an opening 9' is also provided in the edge rib 7 that forms a lateral apron 10.

As is evident from FIGS. 2 and 4, a reinforcement strip (for example made of metal) is pushed through the opening 9' into the openings 9 that align with one another, from the side.

In order for the reinforcement strip 11 not to slip out of the tray 1, a stop is provided in an edge-side opening 9 (not shown), and an elastic tongue 12 is provided in the region of the insertion opening. When the reinforcement strip 11 is pushed through 9', the tongue 12 is bent upward, until the reinforcement strip 11 has been completely introduced. The back end of the reinforcement strip 11 is then situated behind the tongue 12, so that the latter can swing back into its starting position.

For the production of such a tray 1, a molding tool is used that consists essentially of two tool halves. The one tool half molds the accommodation surface 4, while the other tool half molds the ribs structure 5. To form the recesses 8, a core of the mold half that forms the accommodation surface plunges between the cores of the other mold half that form the rib structure, whereby two sides of the cores that correspond to one another touch, in each instance, so that during injection-molding, no plastic material can get in here. After unmolding, recesses 8 having the openings 9 remain at the location where the cores touched.

The invention claimed is:

1. Load carrier, in particular a tray for the transport and storage of goods, having a bottom (2) comprising an accommodation surface (4) for the goods to be transported and a bottom underside having a structure made from ribs (6, 7) crossing each other and projecting vertically from the bottom underside, wherein aligned openings (9) are made from one bottom edge to the opposite bottom edge in adjacent ribs (7) arranged parallel to each other, into said openings a reinforcement strip (11) can be inserted from one edge opening of the load carrier (1) to the opposite edge opening, wherein the edge openings (9) in the ribs (7) are formed by means of recesses (8) made in the ribs through the accommodation surface and at least one of the two edge openings (9) in the ribs (7) is provided with an elastic tongue (12) for the reinforcement strip (11), wherein the elastic tongue (12) is formed in one of the edge openings (9) as a securing element and the edge opening (9) located opposite has a stop element for the reinforcement strip, or that the elastic tongue (12) is formed in each of the two edge openings (9), and the second elastic tongue (12) serves as the stop element, and that the elastic tongue (12) formed in the one of the edge openings is aligned obliquely downwards and in the insertion direction of the reinforcement strip.

2. Load carrier according to claim 1, wherein an elastic tongue (12) is formed into one of the edge openings (9), as a holding element, and the edge opening (9) that lies on the opposite side has a stop element for the reinforcement strip.

3. Load carrier according to claim 1, wherein an elastic tongue is formed into each of two opposite edge openings (9).

4. Method of injection moulding a load carrier, in particular a tray, having a bottom (2) comprising an accommodation surface (4) for goods to be transported and a bottom underside having a structure made from ribs (6, 7) crossing each other and projecting vertically from the bottom underside, wherein aligned openings (9) are made from one bottom edge to the other in adjacent ribs (7) arranged parallel to each other, into said openings a reinforcement strip (11) can be inserted from one edge of the load carrier (1) to the opposite edge, wherein the edge openings (9) in the adjacent ribs (7), aligned parallel to each other, are made in such a way that, one core in a half of the injection moulding tool, which essentially forms the accommodation surface (4), plunges from the receiving surface side into the region of a vertical rib (7), forming a cut-out in the bottom and in the vertical rib, and, opposing the one core, a corresponding core of the second half of the injection moulding tool forms the bottom (2) from the underside, whereby the cores come into contact with each other laterally, wherein an elastic tongue (12) is formed in one of the edge openings (9) as a securing element and the edge opening (9) located opposite has a stop element for the reinforcement strip (11), or that an elastic tongue (12) is formed in each of the two edge openings (9) and the second elastic tongue (12) serves as the stop element, and wherein the elastic tongue (12) formed in the one of the edge openings is aligned obliquely downwards and in the insertion direction of the reinforcement strip (11).

* * * * *